United States Patent
Kimura et al.

(10) Patent No.: US 9,560,704 B2
(45) Date of Patent: Jan. 31, 2017

(54) LED DRIVING DEVICE AND LED LIGHTING APPARATUS

(71) Applicant: Sanken Electric Co., Ltd., Niiza-shi, Saitama (JP)

(72) Inventors: Kengo Kimura, Niiza (JP); Mitsutomo Yoshinaga, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 407 days.

(21) Appl. No.: 14/182,331

(22) Filed: Feb. 18, 2014

(65) Prior Publication Data

US 2014/0232270 A1    Aug. 21, 2014

(30) Foreign Application Priority Data

Feb. 20, 2013  (JP) .................................. 2013-030584

(51) Int. Cl.
  *H05B 33/08*    (2006.01)

(52) U.S. Cl.
  CPC ........ *H05B 33/0815* (2013.01); *H05B 33/083* (2013.01); *H05B 33/086* (2013.01); *H05B 33/0827* (2013.01); *H05B 33/0845* (2013.01); *Y02B 20/341* (2013.01); *Y02B 20/347* (2013.01)

(58) Field of Classification Search
  CPC ............ H05B 33/0827; H05B 33/0815; H05B 33/0857; H05B 33/083; H05B 33/0845; H05B 33/086; H05B 37/02; H05B 33/0851; H05B 33/0884; H05B 33/0866; Y02B 20/347; Y02B 20/341
  USPC .................... 315/186, 200 R, 193, 201–202, 205–207,315/185 R
  See application file for complete search history.

(56) References Cited

U.S. PATENT DOCUMENTS

| | | | | |
|---|---|---|---|---|
| 8,698,849 B2 * | 4/2014 | Woo | ................... | H05B 33/0827 345/102 |
| 2012/0181941 A1 * | 7/2012 | Kimura | .............. | H05B 33/0815 315/200 R |
| 2012/0200229 A1 * | 8/2012 | Kunst | ................ | H05B 33/0815 315/186 |

FOREIGN PATENT DOCUMENTS

| | | |
|---|---|---|
| CN | 102196618 A | 9/2011 |
| CN | 102200247 A | 9/2011 |
| CN | 102630112 A | 8/2012 |
| JP | 2010-068638 A | 3/2010 |
| JP | 2010-282757 A | 12/2010 |
| JP | 2012-155900 A | 8/2012 |

* cited by examiner

*Primary Examiner* — Tuyet Vo
*Assistant Examiner* — Amy Yang
(74) *Attorney, Agent, or Firm* — Mots Law, PLLC

(57) ABSTRACT

The present invention supplies desired DC output power to a first LED load and a second LED load whose color temperature is different from that of the first LED load, includes a switching element, ripple current reducers series-connected to the respective LED loads and for reducing current ripples flowing through the LED loads, and a control circuit for controlling the DC output power so that it has a predetermined value, by performing on-off control of the switching element based on a feedback voltage at a connecting point between each of the LED loads and a corresponding one of the ripple current reducers. Each ripple current reducer has feedback-type constant current control circuits for performing control for varying impedance, and the present invention also includes color controllers for performing color control by maintaining a total LED current value of the first and second LED loads at a certain value.

12 Claims, 4 Drawing Sheets ded in Japanese Patent Application Publication No. 2010-282757. A conventional LED lighting device 100 shown in FIG. 1 includes a commercial power source 102, a power-source switch 103, a microcomputer power source 104, a rectifying circuit 111, a DC power source circuit 112, a power-source synchronizing circuit 113, a microcomputer 114, a non-volatile memory 115, a white LED lighting circuit 121, a red LED lighting circuit 122, and MOSFETs (switching elements) 131.

LED DRIVING DEVICE AND LED LIGHTING APPARATUS

BACKGROUND OF INVENTION

Technical Field

The present invention relates to an LED driving device and an LED lighting apparatus using the same.

Background Art

Light-emitting diode (LED) elements are beginning to be used as a light source for backlight for a liquid crystal display device or a luminaire such as a street light. In particular, an LED lighting apparatus of a fluorescent-tube or bulb type using white LED elements is under development as a luminaire replacing an incandescent bulb or a fluorescent tube. An LED driving device constituting such an LED lighting apparatus is required to supply a predetermined amount of power to the LED elements with high precision.

The LED driving device also performs color control operation for obtaining various colors by using several emission colors. In this case, the color control operation is often controlled by a microcomputer or the like.

FIG. 1 is a circuit diagram showing a circuit configuration of an example of a conventional LED driving device described in Japanese Patent Application Publication No. 2010-282757. A conventional LED lighting device 100 shown in FIG. 1 includes a commercial power source 102, a power-source switch 103, a microcomputer power source 104, a rectifying circuit 111, a DC power source circuit 112, a power-source synchronizing circuit 113, a microcomputer 114, a non-volatile memory 115, a white LED lighting circuit 121, a red LED lighting circuit 122, and MOSFETs (switching elements) 131.

The white LED lighting circuit 121 having series-connected white LEDs and the red LEDs lighting circuit 122 having series-connected red LEDs are connected to an output side of the DC power source circuit 112. Each of the white LED lighting circuit 121 and the red LED lighting circuit 122 has the MOSFET 131 connected to its LEDs in series.

The rectifying circuit 111 is a diode bridge circuit and is configured to rectify an AC voltage of the commercial power source 102 into a DC voltage and output the DC voltage to the DC power source circuit 112. Based on control by the microcomputer 114, the DC power source circuit 112 converts the DC voltage from the rectifying circuit 111 into a predetermined DC voltage and supplies it to the white LED lighting circuit 121 and the red LED lighting circuit 122.

The microcomputer 114 controls on and off of the MOSFETs 131 to control the brightness of the white LEDs and the red LEDs. The microcomputer 114 is configured to detect a temporary-stop control in which the power-source switch 103 is switched off and then switched on again within a predetermined period of time. Upon detection of the temporary-stop control, the microcomputer 114 performs brightness control by lighting at least one group of the white LEDs and the red LEDs at an illuminance different from that used before the power-source switch 103 is switched off.

FIG. 2 is a diagram showing a circuit configuration of another example of a conventional LED driving device described in Japanese Patent Application Publication No. 2012-155900. A conventional luminaire 10 shown in FIG. 2 includes multiple light sources 45 to 48 (LEDs of first to fourth colors) each configured to emit light of a color different from those emitted by the other light sources and a light-source lighting circuit 37 configured to control the brightness of the light from the multiple light sources 45 to 48 by mixing their colors until turning them off. By its brightness control operation, after one of the light sources 45 and 46, e.g., the light source 45, reaches a lower limit of brightness control, the light-source lighting circuit 37 turns off both of the light sources 45 and 46 when the other one, namely the light source 46, reaches a lower limit of brightness control.

In addition, a microcomputer peripheral circuit unit 50 controls first to fourth circuit blocks 41 to 44 to light the multiple light sources 45 to 48.

However, the LED driving devices described in Japanese Patent Application Publication Nos. 2010-282757 and 2012-155900 have complicated circuit configurations since the color control operation is controlled by the microcomputer.

Moreover, even in a case where only two colors, such as a daylight color and a warm color, are subjected to the color control, the circuit configuration is still complicated due to the use of the microcomputer.

An objective of the present invention is to provide an LED driving device and an LED lighting apparatus which are inexpensive and capable of color control operation with a simple circuit having no microcomputer.

SUMMARY OF INVENTION

To solve the above problems, the present invention provides an LED driving device which converts AC input power into desired DC output power and supplies the DC output power to a first LED load and a second LED load whose color temperature is different from a color temperature of the first LED load, the device comprising: a switching element configured to be controlled for on-off operation thereof; a plurality of ripple current reducers series-connected to the respective LED loads and configured to reduce current ripples flowing through the respective LED loads; and a control circuit configured to control the DC output power so that the DC output power has a predetermined value, by controlling on-off operation of the switching element based on a feedback voltage at a connecting point between each of the LED loads and a corresponding one of the ripple current reducers. Each of the ripple current reducers has a feedback-type constant current control circuit configured to perform control for varying impedance, and the device further comprises a color controller for performing color control by maintaining a total LED current value of the first LED load and the second LED load at a certain value.

DESCRIPTION OF EMBODIMENTS

Next, with reference to the drawings, a description is given of an LED driving device and an LED lighting apparatus using the LED driving device, according to Embodiment 1 of the present invention.

The LED driving device and the LED lighting apparatus using the LED driving device according to Embodiment 1 includes a first LED load and a second LED load of different colors, and when a current value for the first LED load is increased, a current value for the second LED load is decreased in a complementary manner. In this way, reciprocal color control of the two colors is performed in which the current values are varied in a seesaw manner. Thereby, equivalent properties can be achieved with a simple circuit configuration without a microcomputer.

Moreover, the present invention achieves reciprocal color control only by adding a few components, by a combination with a ripple-free circuit configured to remove the flicker of LEDs.

Figure 1:
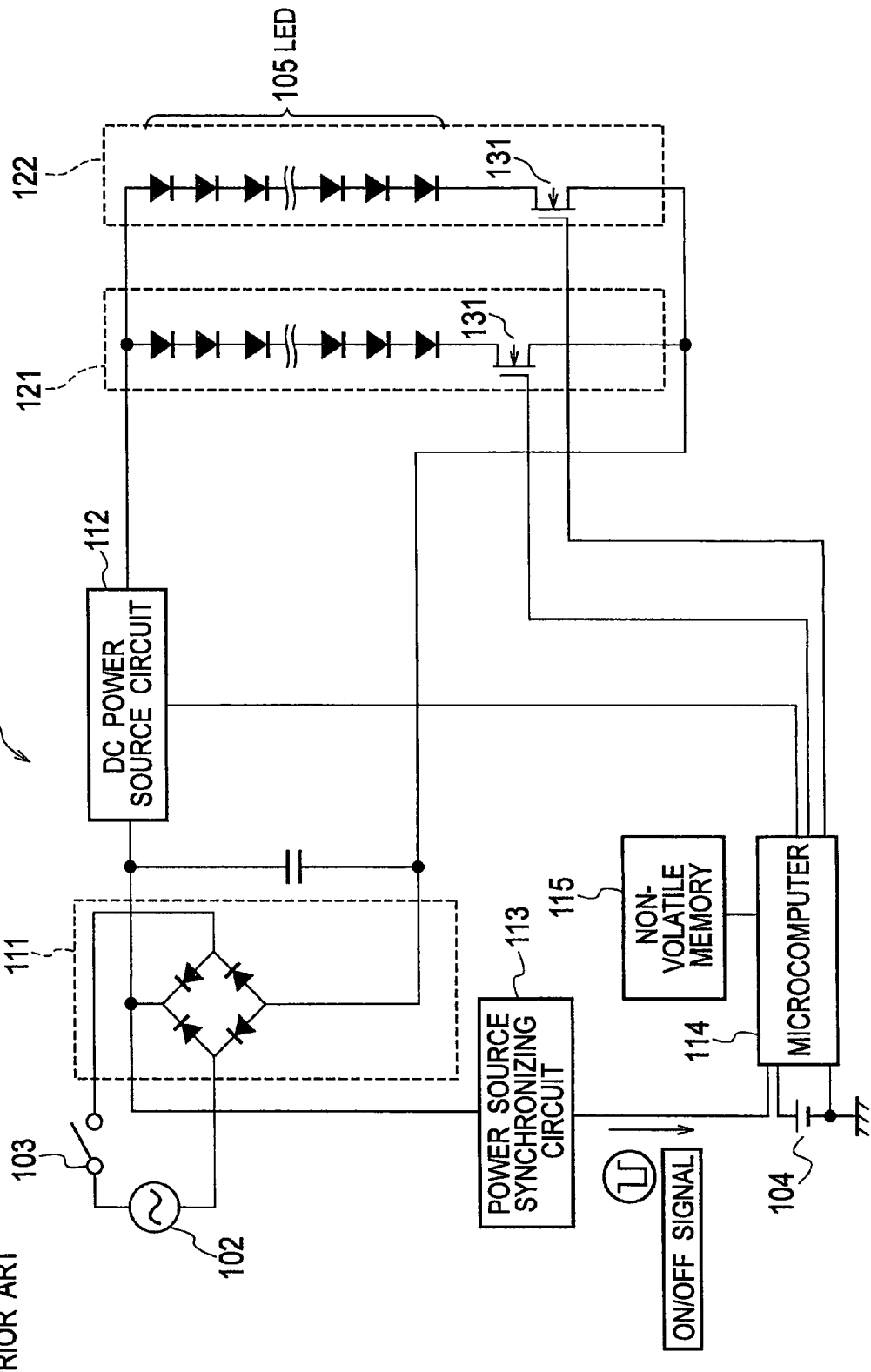
FIG. 1 is a diagram showing a circuit configuration of an example of a conventional LED driving device.
Figure 2:
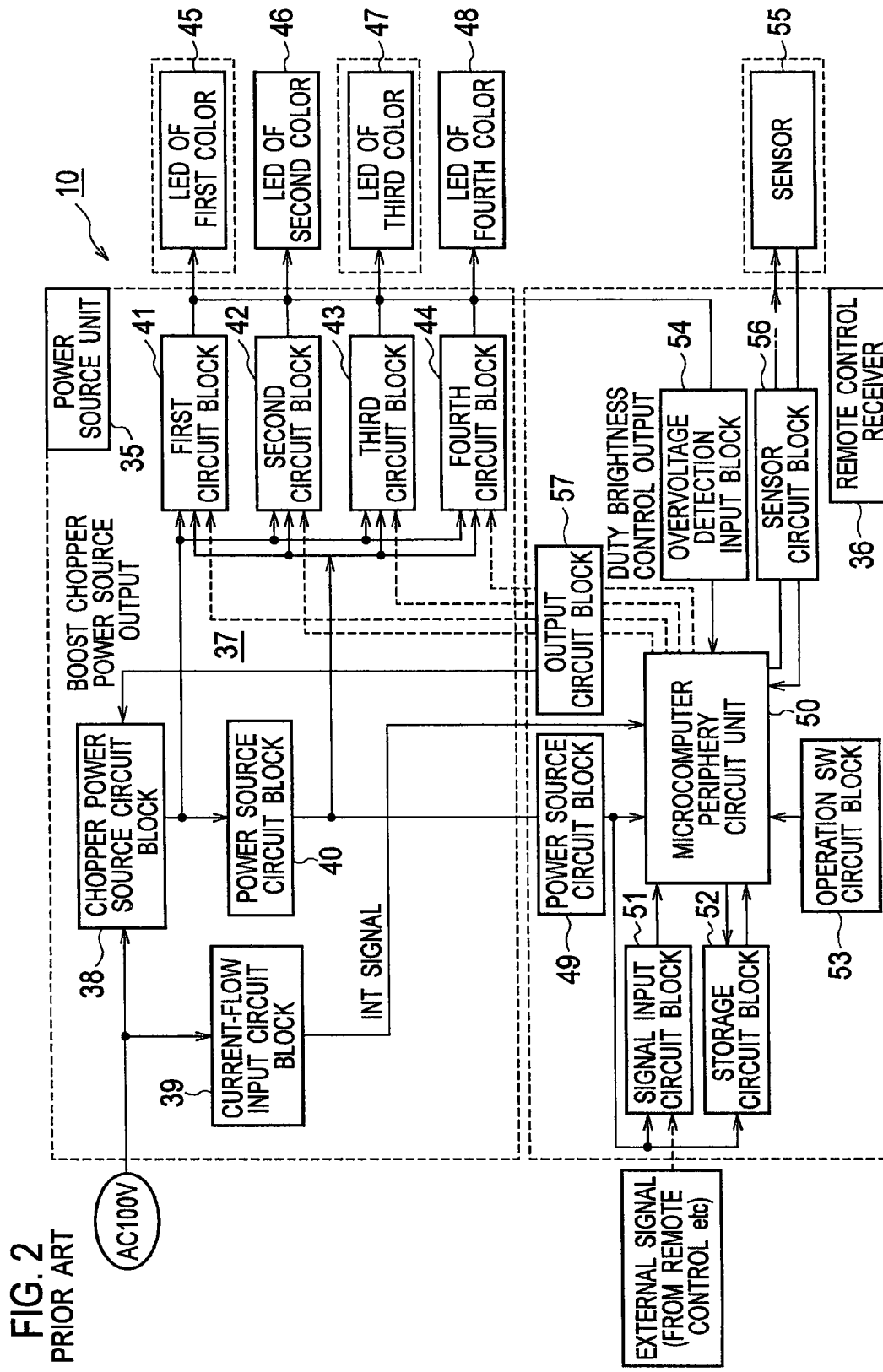
FIG. 2 is a diagram showing a circuit configuration of another example of a conventional LED driving device.
Figure 3:
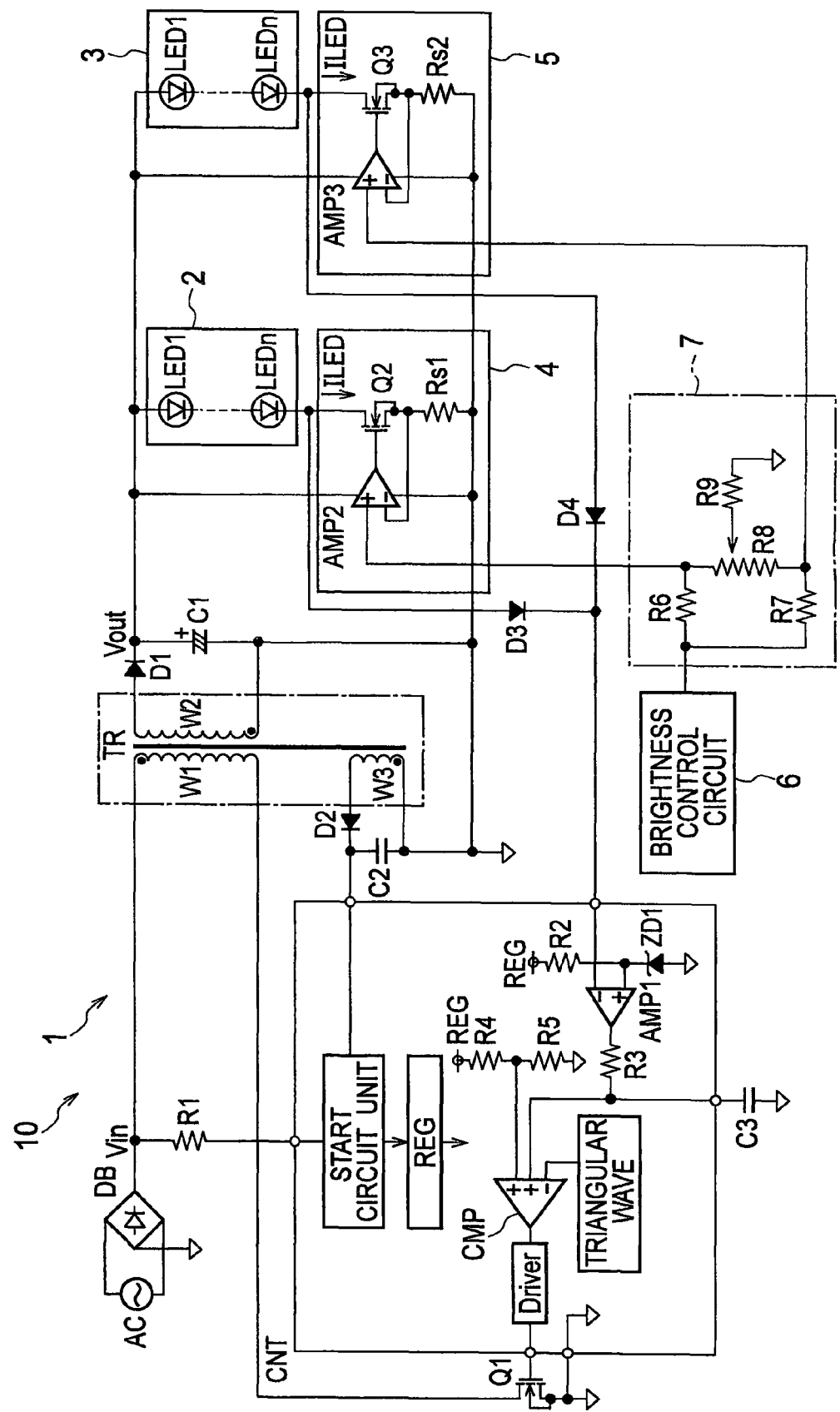
FIG. 3 is a circuit diagram showing the configuration of an LED driving device and an LED lighting apparatus using the LED driving device according to an Embodiment 1 of the present invention.

FIG. 3 is a circuit diagram showing a configuration of an LED driving device 1 and an LED lighting apparatus 10 using the LED driving device 1 according to Embodiment 1 of the present invention. The LED driving device 1 according to Embodiment 1 of the present invention includes a rectifying circuit DB, a transformer TR, a first MOSFET (switching element) Q1, a rectifying-smoothing circuit formed by a diode D1 and a capacitor C1, a control circuit CNT, a capacitor C3, and ripple-current reducing circuits 4 and 5. The LED driving device 1 and LED loads 2 and 3 (each having LED1, . . . LEDn) constitute the LED lighting apparatus 10.

The rectifying circuit DB is a known diode bridge circuit, and is connected to an AC power source AC. The rectifying circuit DB rectifies AC input power into a pulse train in one direction, and outputs it to the transformer TR. The AC power source AC and the rectifying circuit DB may be replaced by, for example, a DC power source such as a battery.

The transformer TR has a primary winding W1, a secondary winding W2, and a tertiary winding W3. The primary winding W1 is connected at one end to one end of the rectifying circuit DB and at the other end to a drain terminal of the first MOSFET Q1. The rectifying-smoothing circuit formed by the diode D1 and the capacitor C1 is connected between both ends of the secondary winding W2. An auxiliary power source formed by a diode D2 and a capacitor C2 is connected between both ends of the tertiary winding W3.

A source terminal of the first MOSFET Q1 is grounded, and a gate terminal thereof is connected to the control circuit CNT.

A series circuit formed by the LED load 2 and the ripple-current reducing circuit 4 is connected to both ends of the rectifying-smoothing circuit formed by the diode D1 and the capacitor C1, the LED load 2 being formed by an n number of series-connected LED elements (LED1, . . . LEDn). Moreover, a series circuit of the LED load 3 and the ripple-current reducing circuit 5 is also connected to both ends of the rectifying-smoothing circuit formed by the diode D1 and the capacitor C1, the LED load 3 being formed by an n number of series-connected LED elements (LED1, . . . LEDn).

Note that n is a natural number of 1 or larger. A cathode of the diode D1 and one end of the capacitor C1 are connected to an anode of the LED element LED1 constituting the LED load 2 and to an anode of the LED element LED1 constituting the LED load 3. The other end of the capacitor C1 is grounded.

Terminals of the control circuit CNT are connected to the gate terminal of the first MOSFET Q1, the auxiliary power source, a connecting point between the cathode of the diode D3 and a cathode of the diode D4, and the capacitor C3. The control circuit CNT is connected to a connecting point between the rectifying circuit DB and the primary winding W1 via a resistance R1. The control circuit CNT includes a first error amplifier AMP1 and a comparator CMP.

An inverting input terminal of the first error amplifier AMP1 is connected to a connecting point between a cathode of the diode D3 and the cathode of the diode D4, and a non-inverting input terminal thereof is connected to a first reference voltage formed by a constant voltage source REG and a zener diode ZD1. An output terminal of the first error amplifier AMP1 is connected to a first non-inverting input terminal of the comparator CMP via an integrating circuit formed by a resistance R3 and the capacitor C3. The first error amplifier AMP1 outputs a first error signal to the comparator CMP via the integrating circuit, the signal being based on a current $I_{LED}$ flowing through the LED load 2, a current $I_{LED}$ flowing through the LED load 3, and a first reference value (first reference voltage).

An inverting input terminal of the comparator CMP is connected to a known triangular-wave generating circuit, and a second non-inverting input terminal thereof is connected to a DUTY limiting circuit formed by a constant voltage source REG and resistances R4 and R5. An output terminal of the comparator CMP is connected to the gate terminal of the first MOSFET Q1 via a driver circuit. The comparator CMP outputs a pulse-width modulation (PWM) signal to the driver circuit, the signal being based on the lower one of the first error signal outputted from the first error amplifier AMP1 and a signal outputted from the DUTY limiting circuit and on a triangular wave outputted from the triangular-wave generating circuit. To be more specific, the comparator CMP increases the duty cycle of the PWM signal (elongates the On duration) when the LED current $I_{LED}$ is lower than the first reference value, and decreases the duty cycle of the PWM signal (shortens the On duration) when the LED current $I_{LED}$ is higher than the first reference value. The DUTY limiting circuit limits the maximum value of the duty cycle of the PWM signal when the first error signal becomes too high.

The first error signal is integrated by the integrating circuit mentioned above, and is inputted to the first non-inverting input terminal of the comparator CMP. Thus, a response speed (response frequency) of the control circuit CNT is lower than a change in the LED current $I_{LED}$, based on a time constant determined by the resistance R3 and the capacitor C3. In the LED driving device 1 according to this embodiment, the time constant determined by the resistance R3 and the capacitor C3 is set such that the first error signal is integrated over a duration which is equal to or longer than one cycle of the AC input power of the AC power source AC. In this case, the duty cycle of the PWM signal is constant within one cycle of the AC input power of the AC power source AC. Thus, a power factor of the LED driving device 1 is improved.

The ripple-current reducing circuit 4 is connected to the rectifying-smoothing circuit formed by the diode D1 and the capacitor C1, to the LED load 2, and to an anode of the diode D3. The ripple-current reducing circuit 5 is connected to the rectifying-smoothing circuit formed by the diode D1 and the capacitor C1, to the LED load 3, and to an anode of the diode D4.

The ripple-current reducing circuit 4 and the ripple-current reducing circuit 5 correspond to the feedback-type constant current control circuits of the present invention. The ripple-current reducing circuit 4 includes a second MOSFET (variable impedance element) Q2, a detection resistance (current detector) Rs1, and a second error amplifier AMP2, and the ripple-current reducing circuit 5 includes a third MOSFET (variable impedance element) Q3, a detection resistance (current detector) Rs2, and a third error amplifier AMP3.

A drain terminal of the second MOSFET Q2 is connected to a cathode of the LED element LEDn, a source terminal thereof is grounded via the detection resistance Rs1, and a gate terminal thereof is connected to an output terminal of the second error amplifier AMP2. The second MOSFET Q2 continuously changes a resistance value between its drain and source according to the output of the second error amplifier AMP2. Thus, the second MOSFET Q2 can be replaced by a known variable resistance element whose resistance value changes according to an electric signal. The response speed of the ripple-current reducing circuit 4 is set to be higher than that of the control circuit CNT, and preferably higher than the frequency of the AC power source AC.

A drain terminal of the third MOSFET Q3 is connected to a cathode of the LED element LEDn, a source terminal thereof is grounded via the detection resistance Rs2, and a gate terminal thereof is connected to an output terminal of the third error amplifier AMP3. The third MOSFET Q3 continuously changes a resistance value between its drain and source according to the output of the third error amplifier AMP3. Thus, the third MOSFET Q3 can be replaced by a known variable resistance element whose resistance value changes according to an electric signal. The response speed of the ripple-current reducing circuit 5 is set to be higher than that of the control circuit CNT, and preferably higher than the frequency of the AC power source AC.

A connecting point between the detection resistance Rs1 and the source terminal of the second MOSFET Q2 is connected to an inverting input terminal of the second error amplifier AMP2. The detection resistance Rs1 converts the current $I_{LED}$ flowing through the LED load 2 into a voltage signal and outputs the voltage signal to the second error amplifier AMP2. The detection resistance Rs1 may be replaced by other current detector, e.g., a current transformer, and may be replaced by a configuration capable of converting the LED current $I_{LED}$ into an electric signal besides the voltage signal and outputs the electric signal.

A connecting point between the detection resistance Rs2 and the source terminal of the third MOSFET Q3 is connected to an inverting input terminal of the third error amplifier AMP3. The detection resistance Rs2 converts the current $I_{LED}$ flowing through the LED load 3 into a voltage signal and outputs the voltage signal to the third error amplifier AMP3. The detection resistance Rs2 may be replaced by other current detector, e.g., a current transformer, and may be replaced by a configuration capable of converting the LED current $I_{LED}$ into an electric signal besides the voltage signal and outputs the electric signal.

Anon-inverting input terminal of the second error amplifier AMP2 is connected to a brightness control circuit 6 via a resistance R6 of a color control signaling unit 7. The output terminal of the second error amplifier AMP2 is connected to a gate terminal of the second MOSFET Q2. The second error amplifier AMP2 outputs a second error signal to the second MOSFET Q2, the signal being based on the current $I_{LED}$ flowing through the LED load 2 and a second reference value (second reference voltage). More specifically, the smaller the LED current $I_{LED}$ is relative to the second reference value, the more the second error amplifier AMP2 increases the voltage level of the second error signal, decreasing the resistance value between the source and drain of the second MOSFET Q2. Similarly, the larger the LED current $I_{LED}$ is relative to the second reference value, the more the second error amplifier AMP2 decreases the voltage level of the second error signal, increasing the resistance value between the source and drain of the second MOSFET Q2.

In the LED driving device 1 according to Embodiment 1 of the present invention, the control circuit CNT performs on-off control of the first MOSFET Q1 such that the current $I_{LED}$ flowing through the LED load 2 equals the first reference value (first reference voltage). Specifically, the LED driving device 1 converts AC input power into DC power and supplies the DC power to the LED load 2, as a conventional LED driving device does. Thus, an output voltage $V_{out}$ (voltage between the terminals of the capacitor C1) contains commercial ripple voltage fluctuations, as a conventional LED driving device does.

However, in the LED driving device 1 according to Embodiment 1 of the present invention, the ripple-current reducing circuit 4 controls the second MOSFET Q2 so that the second error signal based on the LED current $I_{LED}$ equals the second reference value (second reference voltage). Thus, in the LED driving device 1 according to Embodiment 1 of the present invention, the LED current $I_{LED}$, which contains large current change in a conventional driving device, is controlled to have smaller current ripples.

A non-inverting input terminal of the third error amplifier AMP3 is connected to the brightness control circuit 6 via a resistance R7 of the color control signaling unit 7. The output terminal of the third error amplifier AMP3 is connected to a gate terminal of the third MOSFET Q3. The third error amplifier AMP3 outputs a second error signal to the third MOSFET Q3, the signal being based on the current $I_{LED}$ flowing through the LED load 3 and the second reference value (second reference voltage). More specifically, the smaller the LED current $I_{LED}$ is relative to the second reference value, the more the third error amplifier AMP3 increases the voltage level of the second error signal, decreasing the resistance value between the source and drain of the third MOSFET Q3. Similarly, the larger the LED current $I_{LED}$ is relative to the second reference value, the more the third error amplifier AMP3 decreases the voltage level of the second error signal, increasing the resistance value between the source and drain of the third MOSFET Q3.

In the LED driving device 1 according to Embodiment 1 of the present invention, the control circuit CNT performs on-off control of the first MOSFET Q1 such that the current $I_{LED}$ flowing through the LED load 3 equals the first reference value (first reference voltage). Specifically, the LED driving device 1 converts AC input power into DC power and supplies the DC power to the LED load 3, as a conventional LED driving device does. Thus, the output voltage $V_{out}$ (voltage between the terminals of the capacitor C1) contains commercial ripple voltage fluctuations, as a conventional LED driving device does.

However, in the LED driving device 1 according to Embodiment 1 of the present invention, the ripple-current reducing circuit 5 controls the third MOSFET Q3 such that the second error signal based on the LED current $I_{LED}$ equals the second reference value (second reference voltage). Thus, in the LED driving device 1 according to Embodiment 1 of the present invention, the LED current $I_{LED}$, which contains large current change in a conventional driving device, is controlled to have smaller current ripples.

Hence, in the LED driving device 1 according to Embodiment 1 of the present invention, the ripple-current reducing circuits 4 and 5 do not need to perform operation for improving the power factor, and therefore, can have control response speed (response frequency) higher than that of the control circuit CNT, allowing reduction in the current ripples contained in the LED currents $I_{LED}$ flowing through the LED loads 2 and 3.

Further, the brightness control circuit 6 outputs a brightness control signal to the resistance R6 and the resistance R7 of the color control signaling unit 7, the signal being for controlling the total illuminance of the LED loads 2 and 3 by varying their LED current values at the same rate. An output terminal of the brightness control circuit 6 is connected to the non-inverting input terminal of the second error amplifier AMP2 via the resistance R6. The output terminal of the brightness control circuit 6 is also connected to the non-inverting input terminal of the third error amplifier AMP3 via the resistance R7. A variable resistance R8 is connected between one end of the resistance R6 and one end of the resistance R7, and a resistance R9 is connected at one end to a middle portion of the variable resistance R8 and is grounded at the other end. In other words, the variable resistance R8 is grounded via the resistance R9.

The resistances R6 and R7, the variable resistance R8, and the resistance R9 form the color control signaling unit 7 of the present invention. This color control signaling unit 7 performs color control by maintaining the total LED current value of the LED load 2 and the LED load 3 at a certain value.

In the color control signaling unit 7, by varying the resistance value of the variable resistance R8, a voltage at the resistance R6 and a voltage at one end of the variable resistance R8 are applied to the non-inverting input terminal of the second error amplifier AMP2 as a reference voltage, and a voltage at the resistance R7 and a voltage at the other end of the variable resistance R8 are applied to the non-inverting input terminal of the third error amplifier AMP3 as a reference voltage. In other words, by dividing each other's reference voltages with the variable resistance R8 and the resistance R9 and varying the resistance value of the variable resistance R8, the brightness of the LEDs of two colors can be varied in a seesaw manner. Thus, reciprocal color control of the LED load 2 and the LED load 3 can be implemented.

In the LED driving device and the LED lighting apparatus using the LED driving device according to Embodiment 1 of the present invention, the color control signaling unit 7 performs color control by maintaining the total LED current value of the first LED load 2 and the second LED load 3 at a certain value. Thus, color control operation can be performed using a simple circuit having no microcomputer, which enables inexpensive provision of the LED driving device and the LED lighting apparatus.

Figure 4:
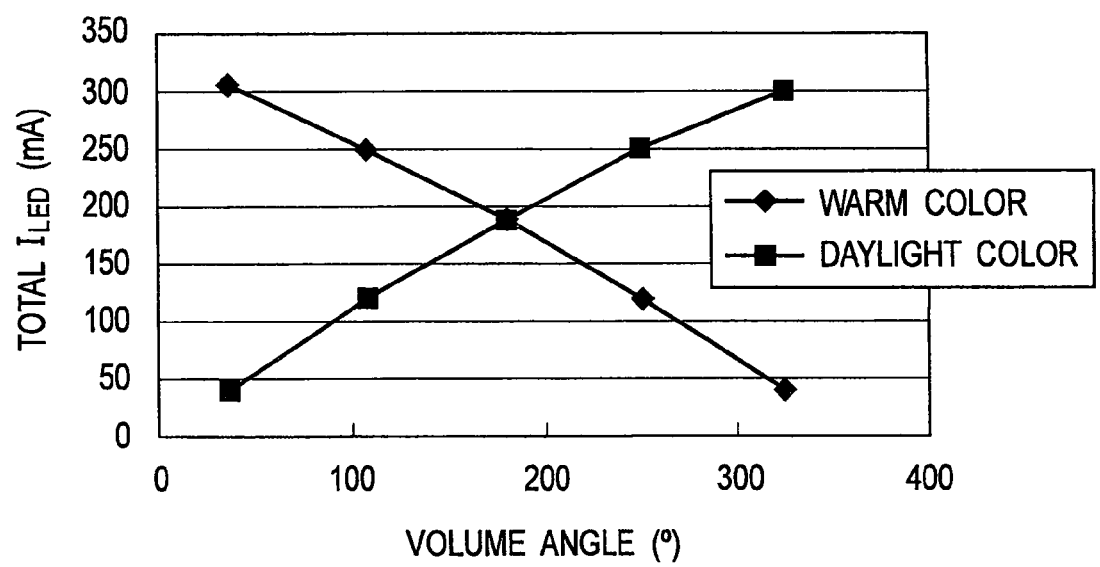
FIG. 4 is a diagram showing linearity characteristics of color control of a warm color and a daylight color at 100% brightness in the LED driving device and the LED lighting apparatus using the LED driving device according to Embodiment 1 of the present invention.
Figure 5:
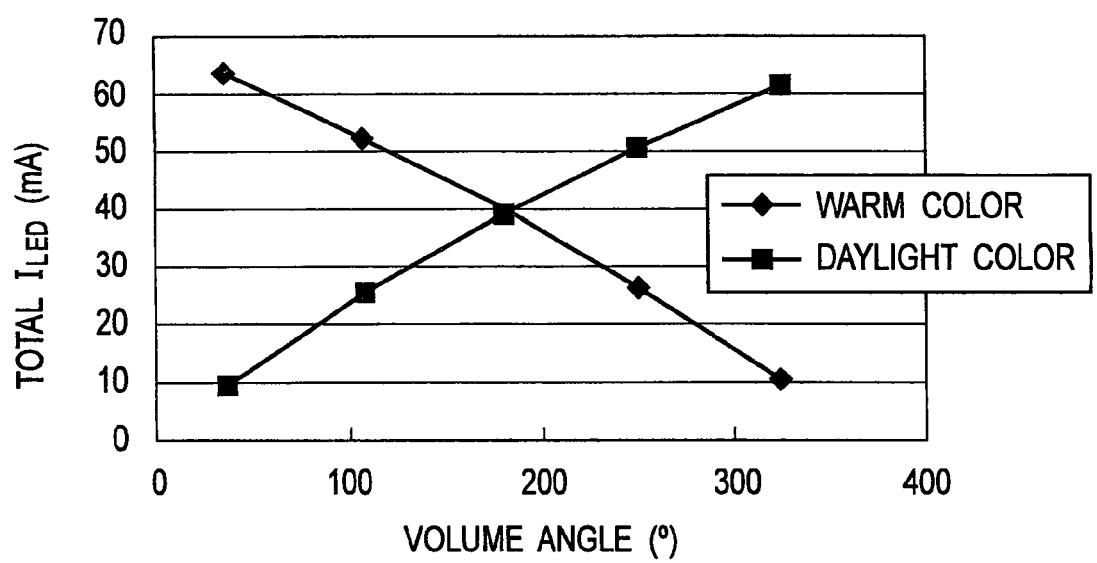
FIG. 5 is a diagram showing linearity characteristics of color control of a warm color and a daylight color at 10% brightness in the LED driving device and the LED lighting apparatus using the LED driving device according to Embodiment 1 of the present invention.

FIG. 4 is a diagram showing linearity characteristics of color control of a warm color and a daylight color at 100% brightness in the LED driving device and the LED lighting apparatus using the LED driving device according to Embodiment 1 of the present invention. FIG. 5 is a diagram showing linearity characteristics of color control of a warm color and a daylight color at 10% brightness in the LED driving device and the LED lighting apparatus using the LED driving device according to Embodiment 1 of the present invention. In the examples shown in FIGS. 4 and 5, the voltage of the AC power source AC is 100 V, and the brightness controller provides 100% brightness and 10% brightness, respectively.

In FIGS. 4 and 5, in either case of the 10% brightness and the 100% brightness, the current $I_{LED}$ of the warm color and the current $I_{LED}$ of the daylight color are in reciprocal relation to each other relative to the volume angle of the variable resistance R8, and as it can be seen in FIGS. 4 and 5, reciprocal color control operation between the LED load 2 and the LED load 3 can be implemented.

Embodiment 1 of the present invention described thus far employs a non-insulating method shown in FIG. 3, but can also be implemented in an insulating method using an insulating element such as a photo coupler at the connection between the inverting input terminal of the first error amplifier AMP1 and the connecting point between the cathode of the diode D3 and the cathode of the diode D4.

It should be noted that the present invention is not limited to the LED driving device and the LED lighting apparatus using the LED driving device according to Embodiment 1 described above. In the LED driving device and the LED lighting apparatus using the LED driving device according to Embodiment 1, a DC voltage is generated using the AC power source AC and the rectifying circuit DB, and is then converted into another DC voltage. Alternatively, as Embodiment 2, the present invention may be applied to an LED driving device and an LED lighting apparatus using the LED driving device in which a DC input voltage of a DC power source is converted into a desired DC output voltage, and the converted DC input voltage is supplied to the first LED load and the second LED load whose color temperature is different from that of the first LED load.

In this case, the LED driving device according to Embodiment 2 includes a switching element configured to be controlled for its on-off operation, feedback-type constant current control circuits series-connected to respective LED loads and configured to perform control for varying impedance, a control circuit configured to control DC output power so that it may have a predetermined value by performing on-off control of the switching element based on a feedback voltage at a connecting point between each of the LED loads and a corresponding one of the feedback-type constant current control circuits, and a color controller configured to perform color control by maintaining the total LED current value of the first LED load and the second LED load at a certain value.

Thereby, the LED driving device of Embodiment 2 can also offer effects similar to those offered by that of Embodiment 1. In other words, the color control can be achieved in either case of AC input or DC input. Further, in the case of DC input, the AC power source AC and the rectifying circuit DB are unnecessary.

According to the present invention, the color controller performs color control by maintaining the total LED current value of the first LED load and the second LED load at a certain value. Thus, the color control operation can be performed using a simple circuit having no microcomputer, enabling inexpensive provision of the LED driving device and the LED lighting apparatus.

What is claimed is:
1. An LED driving device which converts AC input power into desired DC output power and supplies the DC output power to a first LED load and a second LED load whose color temperature is different from a color temperature of the first LED load, the device comprising:
- a switching element configured to be controlled for on-off operation thereof;
- a first ripple current reducer series-connected to the first LED load and configured to reduce current ripples flowing through the first LED load;
- a second ripple current reducer series-connected to the second LED load and configured to reduce current ripples flowing through the second LED load; and
- a control circuit configured to control the DC output power so that the DC output power has a predetermined value, by controlling on-off operation of the switching element based on a feedback voltage at a connecting point between the first LED load and the first ripple current reducer, and a feedback voltage at a connecting point between the second LED load and the second ripple current reducer, wherein
- the first ripple current reducer has a first feedback-type constant current control circuit configured to perform control for varying impedance, the second ripple current reducer has a second feedback-type constant current control circuit configured to perform control for varying impedance, and
- the device further comprises a color controller for performing color control by maintaining a total LED current value of the first LED load and the second LED load at a certain value wherein
- the color controller comprises a first resistance, a second resistance, a third resistance and variable resistance,
- a voltage at the first resistance and a voltage at one end of the variable resistance are applied to the first feedback-type constant current control circuit as a first reference voltage, and a voltage at the second resistance and a voltage at the other end of the variable resistance are applied to the second feedback-type constant current control circuit as a second reference voltage by dividing the first reference voltage and the second reference voltage with the variable resistance and the third resistance and by varying the resistance value of the variable resistance, and
- the color controller is configured to control a total luminance of the first LED load and the second LED load by varying LED current values of the first LED load and the second LED load.

2. The LED driving device according to claim 1, wherein the control circuit performs on-off control of the switching element so that a current flowing through each of the LED loads equals a first reference value.

3. The LED driving device according to claim 1, wherein the feedback-type constant current control circuits continuously perform control for varying the impedance such that the current flowing through the each of the LED loads approximates a second reference value.

4. The LED driving device according to claim 3, wherein a response speed of each of the feedback-type constant current control circuits is higher than a response speed of the control circuit.

5. The LED driving device according to claim 1, wherein a response frequency of the control circuit is equal to or lower than a frequency of the AC input power.

6. An LED lighting apparatus comprising the LED driving device according to claim 1.

7. An LED driving device which converts a DC input voltage of a DC power source into a desired DC output voltage and supplies the DC output voltage to a first LED load and a second LED load whose color temperature is different from a color temperature of the first LED load, the device comprising:
- a switching element configured to be controlled for on-off operation thereof;
- a first feedback-type constant current control circuit series-connected to the first LED load and configured to perform control for varying impedance;
- a second feedback-type constant current control circuit series-connected to the second LED load and configured to perform control for varying impedance;
- a control circuit configured to control the DC output power so that the DC output power has a predetermined value, by controlling on-off operation of the switching element based on a feedback voltage at a connecting point between the first LED load and the first feedback-type constant current control circuit and a feedback voltage at a connecting point between the second LED load and the second feedback-type constant current control circuit; and
- a color controller for performing color control by maintaining a total LED current value of the first LED load and the second LED load at a certain value wherein
- the color controller comprises a first resistance, a second resistance, a third resistance and variable resistance,
- a voltage at the first resistance and a voltage at one end of the variable resistance are applied to the first feedback-type constant current control circuit as a first reference voltage, and a voltage at the second resistance and a voltage at the other end of the variable resistance are applied to the second feedback-type constant current control circuit as a second reference voltage by dividing the first reference voltage and the second reference voltage with the variable resistance and the third resistance and by varying the resistance value of the variable resistance, and
- the color controller is configured to control a total luminance of the first LED load and the second LED load by varying LED current values of the first LED load and the second LED load.

8. The LED driving device according to claim 7, wherein the control circuit performs on-off control of the switching element so that a current flowing through each of the LED loads equals a first reference value.

9. The LED driving device according to claim 7, wherein the feedback-type constant current control circuit continuously performs control for varying the impedance such that the current flowing through each of the LED loads approximates a second reference value.

10. The LED driving device according to claim 8, wherein a response speed of each of the feedback-type constant current control circuits is higher than a response speed of the control circuit.

11. The LED driving device according to claim 7, wherein a response frequency of the control circuit is equal to or lower than a frequency of the AC input power.

12. An LED lighting apparatus comprising the LED driving device according to claim 7.

* * * * *